United States Patent [19]

Graen

[11] Patent Number: 5,421,431
[45] Date of Patent: Jun. 6, 1995

[54] AUTOMATIC POWDERED GRAPHITE APPLICATOR

[76] Inventor: Duane Graen, 2 Birch Ct., Union, Nebr. 68455

[21] Appl. No.: 292,387

[22] Filed: Aug. 18, 1994

[51] Int. Cl.⁶ .............................................. F16N 27/00
[52] U.S. Cl. ....................................... 184/7.4; 184/81;
184/65; 184/109; 184/79; 222/485; 222/504; 34/108
[58] Field of Search ..................... 184/7.4, 109, 81, 65, 184/79; 222/185, 485, 504, 518, 559; 34/108, 135, 136, 595

[56] References Cited

U.S. PATENT DOCUMENTS

| | | |
|---|---|---|
| 423,202 | 3/1890 | Andersson . |
| 1,714,809 | 5/1926 | Oliver . |
| 2,199,494 | 5/1940 | Johnson . |
| 3,054,534 | 9/1962 | Vollmer . |
| 3,240,401 | 3/1966 | Kirschmann ........................ 222/559 |
| 3,576,081 | 4/1971 | McCrary ............................. 184/109 |
| 3,960,132 | 6/1976 | Goserud . |
| 4,201,070 | 5/1980 | Seaton et al. . |
| 4,537,284 | 8/1985 | Breisinger et al. ................... 184/7.4 |
| 4,721,147 | 1/1988 | Evans . |
| 5,081,858 | 1/1992 | Ito et al. . |
| 5,099,667 | 3/1992 | Schmitter et al. . |
| 5,289,954 | 3/1994 | Bruggendick et al. .............. 222/559 |
| 5,340,030 | 8/1994 | Siegrist, Jr. ......................... 222/485 |

Primary Examiner—Thomas E. Denion
Attorney, Agent, or Firm—John A. Beehner

[57] ABSTRACT

The present invention is a graphite lubrication apparatus for lubricating the support rollers of a drying kiln, dryer or the like by dispensing graphite powder across the surface of the rollers. It has a graphite storage means for storing the graphite powder to be used for lubrication; a dispensing pipe adjacent the graphite storage means and having a top and bottom and a plurality of receiving holes in the top thereof the receiving holes permitting communication of the graphite from the storage means into the dispensing pipe. The dispensing pipe also having a plurality of discharge holes positioned adjacent the roller. The discharge holes permit the discharge of graphite onto the roller. A discharge means discharges graphite from the dispensing pipe onto the roller. The discharge means is movable between a discharge position wherein the receiving and discharge holes are open and a closed position wherein the discharge and receiving holes are closed whereby the discharge means is operative to effect the application of graphite to the roller. A control means is operative to move the discharge means from the discharge position to the closed position. The timing and duration of application may be modified.

11 Claims, 4 Drawing Sheets

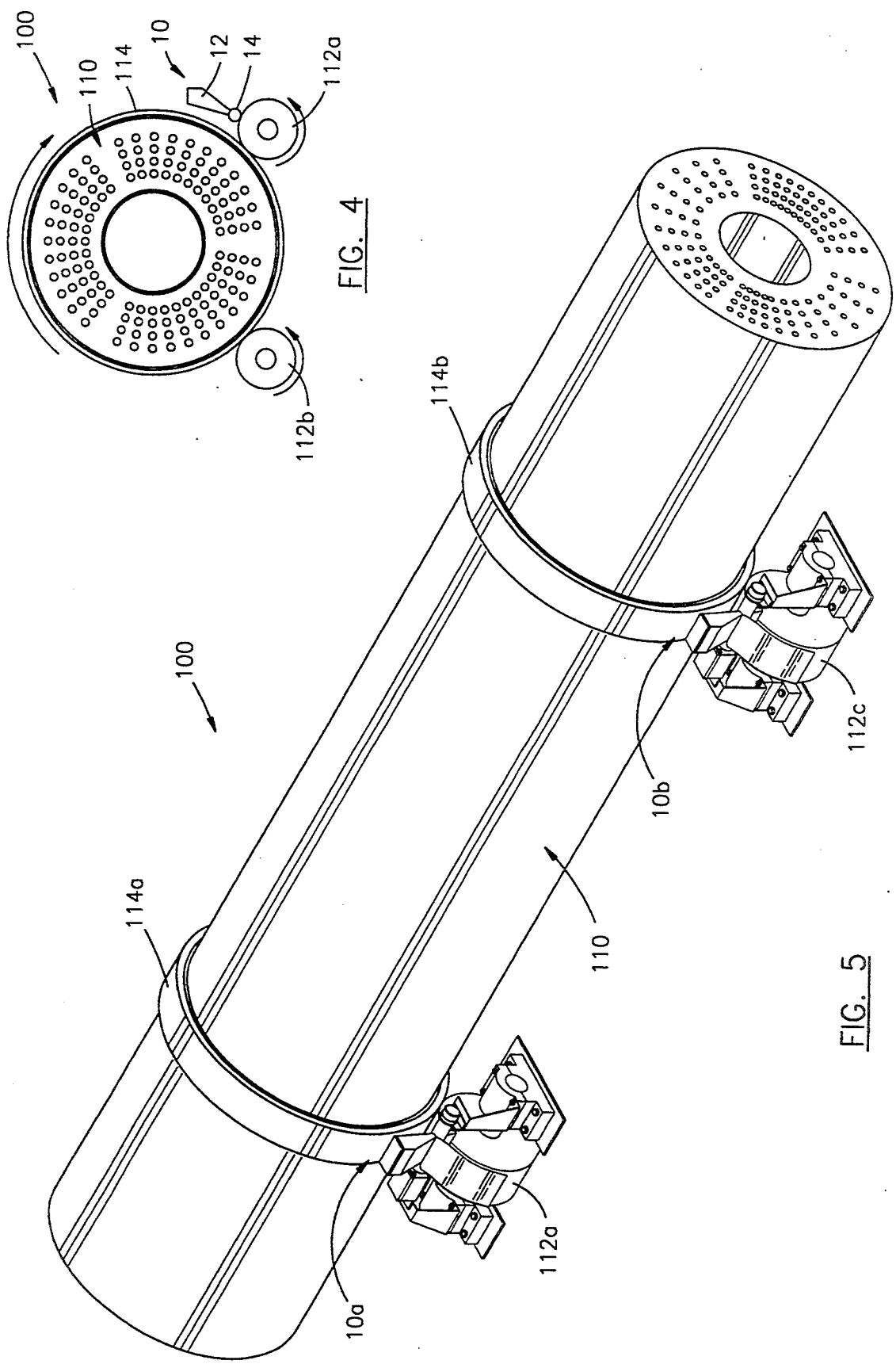

AUTOMATIC POWDERED GRAPHITE APPLICATOR

BACKGROUND OF THE INVENTION

1. Technical Field

The method and apparatus of the present invention relate generally to lubrication devices and methods. More specifically, they relate to an apparatus and method of lubricating the support rollers of kilns and dryers, coolers, granulators, calsanators or other devices which require lubrication during rotation. Such dryers, kilns or the like are rotated in order to effect uniform drying of the material therein.

Currently, the support rollers of a kilns, dryers or the like are lubricated by applying a thin coating of oil on the rollers. Due however to the extreme weight which is supported by the support rollers, this oil can become infused into the surface of the roller. After a time, the oil will cause cracks or spalls on the surface. Consequently, prolonged application of lubricating oil onto the surface of the support roller necessitates grinding of the rollers periodically. A major drawback associated with the grinding requirement is the high cost of performing the grinding in addition to the down time associated therewith.

Another lubrication alternative currently in use is the application of grease to the support roller. However, this method has serious environmental drawbacks including the recent disfavor this alternative has fallen into with the environmental protection agency.

One additional alternative is the application of the lubrication graphite to the support rollers by means of graphite blocks. However, this alternative suffers from the unreliability of both precision of application quantity and the interval of application as well as the glazing of the graphite block and trapping particals in the surface which can scratch the rollers. Powdered graphite is the solution to these problems.

Consequently, it is highly desirable to provide an automatic lubrication apparatus which is adapted to provide a measured quantity of lubricating powdered graphite to the support rollers and to make such application at specific, predetermined intervals thereby maximizing the lubricating effect of the graphite.

2. Description of the Prior Art

Evans, U.S. Pat. No. 4,721,147 discloses a method and apparatus for making small lead objects such as bullets. As part of Evans' invention, he teaches application of a dry powdered lubricant into the surface of the bullet at the time of fabrication. Evans uses a metering bar for a single point application of a dose of graphite into the punch die.

Oliver, U.S. Pat. No. 1,714,809 discloses a lubrication apparatus for use on locomotive valve mechanisms and pistons.

Schmitter et al., U.S. Pat. No. 5,990,667 discloses a system for preparing and applying a graphite lubricant suspension to tools or work pieces. Schmitter discloses that the lubricant will be a fifty-fifty mixture of water and graphite and would be sprayed through a plurality of linearly distributed nozzles over a roller or the like.

Although several of these prior devices disclose applications and use of graphite as a lubricating mechanism, there is no disclosure or suggestion of the use of a graphite powder to lubricate the support rollers of a drying kiln or the like. Consequently, there is a great need for an apparatus which is capable of automatically dispensing a predetermined amount of lubricating graphite powder along the face of a support roller in conjunction with a drying kiln or the like.

Therefore, an object of the present invention is to provide an apparatus and method of efficiently and precisely dispensing a predetermined quantity of lubricating graphite powder along the top surface of a support roller in conjunction with a rotating dryer, kiln or the like.

An additional objective is to provide an apparatus which is capable of precise control as to timing and quantity of lubricating graphite powder to a support roller associated with a drying kiln or the like.

Another objective of the present invention is to provide a lubrication apparatus which utilizes an environmentally friendly lubrication means for lubricating the support rollers for a drying kiln or the like.

Another objective is to provide an apparatus wherein the timing control of application can be adjusted.

Another objective of the present invention is to provide lubrication apparatus which eliminates the necessity of costly grinding of support rollers associated with drying kilns or the like.

SUMMARY OF THE INVENTION

The present invention is a graphite lubrication apparatus for lubricating the support rollers of a kiln, dryer or the like by dispensing graphite powder across the surface of the roller. It has a graphite storage means for storing the graphite powder to be used for lubrication; a dispensing pipe adjacent the graphite storage means and having a top and bottom and a plurality of receiving holes in the top thereof the receiving holes permitting communication of the graphite from the storage means into the dispensing pipe. The dispensing pipe also having a plurality of discharge holes positioned adjacent the roller. The discharge holes permit the discharge of graphite onto the roller. A discharge means discharges graphite from the dispensing pipe onto the roller. The discharge means is movable between a discharge position wherein the receiving and discharge holes are open and a closed position wherein the discharge and receiving holes are closed whereby the discharge means is operative to effect the application of graphite to the roller. A control means is operative to move the discharge means from the discharge position to the closed position. The timing and duration of application may be modified.

BRIEF DESCRIPTION OF THE DRAWINGS

FIG. 4 is a front view of the working environment for the lubrication apparatus including a typical rotating dryer and associated support rollers showing the installation of the apparatus thereon.

FIG. 5 is a front perspective view again showing the working environment of the invention and further details of a typical rotating dryer and installation of the graphite lubrication apparatus of the present invention.

DESCRIPTION OF THE PREFERRED EMBODIMENTS

Rotary dryers, kilns and the like are used for many purposes including the drying of cement, corn, sand or the like. These rotary dryers conventionally have a large cylindrical drying tube in which the material to be dried is placed. It is desirable to rotate the cylinder during the drying procedure so as to effect a uniform drying of the material therein. Around the drying tube is placed two "tires." A pair of support rollers is associated with each "tire" and upon which the cylinder is placed for rotation. Because of the extreme weight on the rollers from the drying cylinder, and the wear associated therewith, it is desirable to lubricate the roller/tire interface. While conventional lubrication methods such as grease and oil can provide effective lubrication, they can have detrimental environmental impacts. Additionally, because of the pressure involved, the oil or grease can penetrate the surface of the rollers causing glazing of the rollers and necessitating expensive grinding. Therefore, a more efficient method of lubricating the rollers is necessary.

Figure 1:
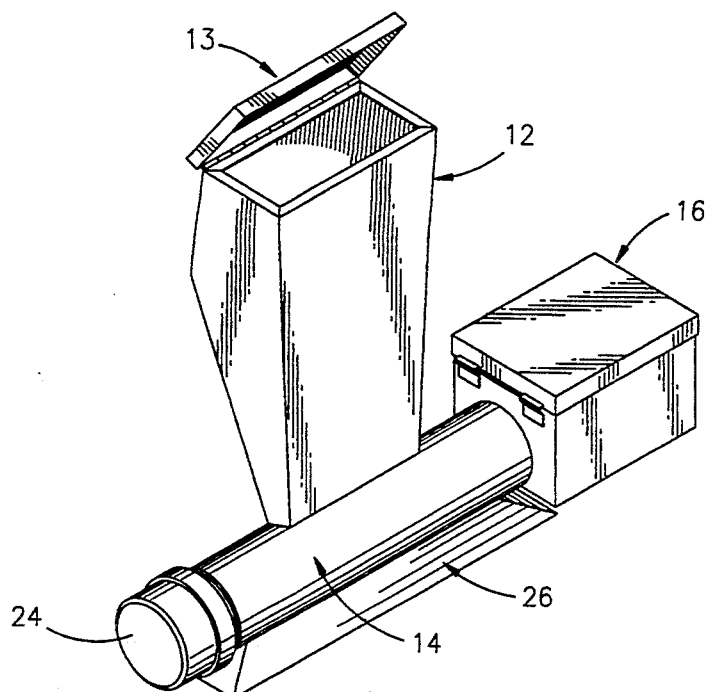
FIG. 1 is a front perspective view showing the graphite lubrication apparatus in assembled form.

FIG. 1 is a perspective view illustrating the major external components of the apparatus. As seen in the figure, the apparatus comprises a graphite lubrication powder storage box 12 having a pivotally attached lid 13. Storage box 12 provides a means for placing a reserve of graphite powder for use in the lubricating apparatus. Depending on the frequency of graphite discharge, approximately a 3 weeks worth of graphite may be stored. As seen in the figure, the upper portion of box 12 is angled slightly so that when the apparatus is installed above the support rollers, the lid 13 is stationed in the horizontal plate facilitating the depositing of a reserve of graphite in box 12. It is also seen in the figure, the lower portion of box 12 tapers to facilitate the urging of the stored graphite downwardly. Box 12 is connected to the top of dispensing pipe 14. Graphite receiving holes 18a-f (not shown) allow the graphite stored in box 12 to be communicated into dispensing pipe 14 when holes 18a-f are not covered. Dispensing pipe 14 is a hollow cylindrical tube having a plurality of holes 18a-f and 22a-d at the top and bottom thereof for receiving and dispensing graphite respectively. Cap 24 is threadably secured to one end of pipe 14 and is operative to seal pipe 14 from external contamination. Controller 16 is secured to the end of pipe 14 opposite cap 24 and is operative to control the internal dispensing means illustrated in FIG. 2 below. Finally, FIG. 1 illustrates the rain deflector 26 operative to deflect any rain striking the apparatus. Thus, rain deflector 26 is operative to prevent any rain from recessing under pipe 14 and into dispensing holes 22a-d on the bottom side thereof.

Figure 2:
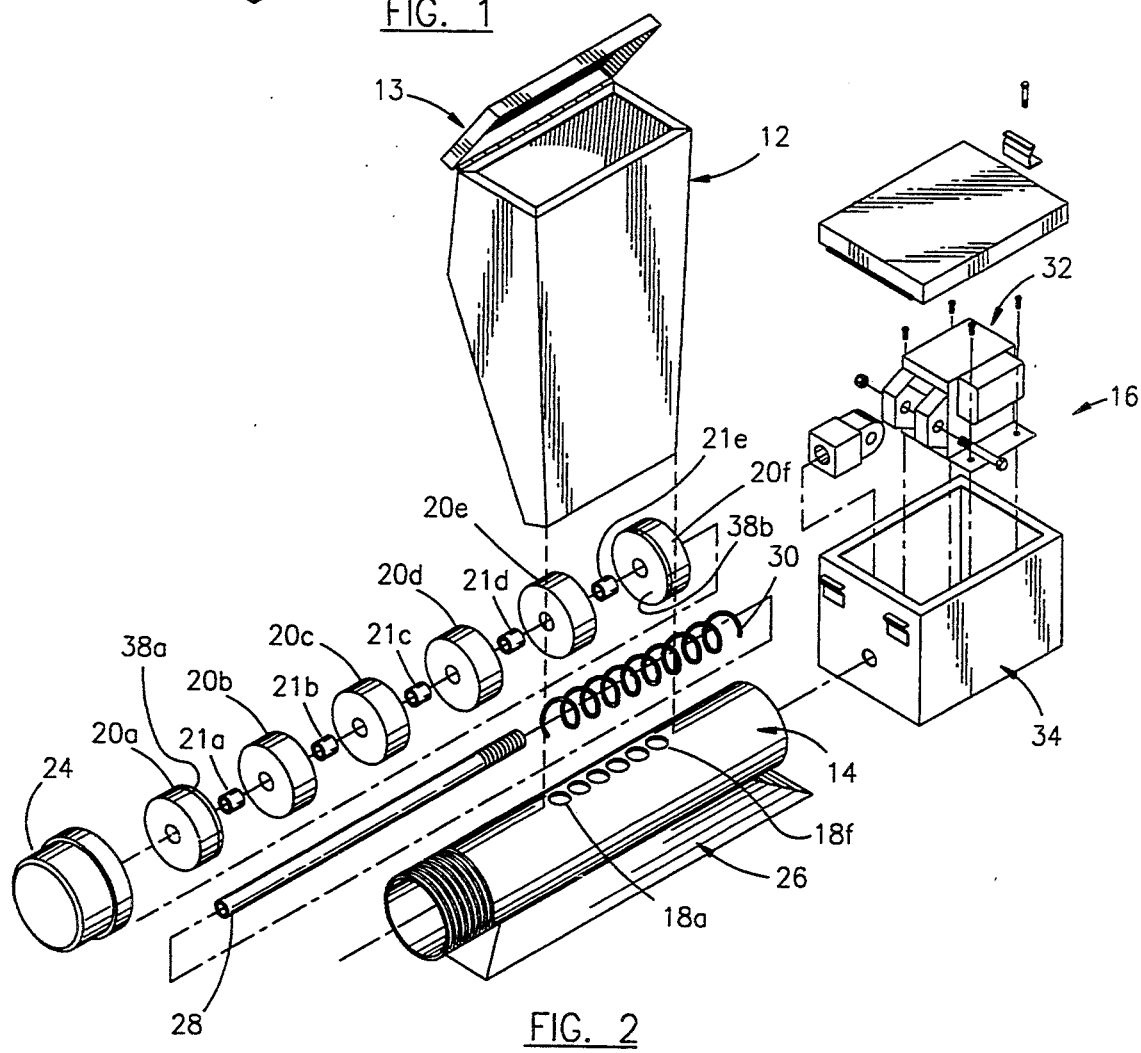
FIG. 2 is a front, perspective exploded view showing the external as well as the internal components comprising the lubrication apparatus.

FIG. 2 is an exploded perspective view providing a more detailed illustration of the internal working components of the apparatus. In particular, details of the internal dispensing means are illustrated with clarity. The internal dispensing means comprises a plurality of pistons and spacers 20a-f and 21a-e respectively mounted on a shaft 28. Spacers 21a-e are placed between pistons 20a-f in such a manner that the spacing between pistons 20a-f corresponds identically to the placement of the receiving holes 18a-f on the top portion of dispensing pipe 14 and dispensing holes 22a-d (not shown) on the bottom of dispensing pipe 14. Normally, the discharge means would be configured in the closed position wherein the receiving holes 18a-f and dispensing holes 22a-d (not shown) would be covered by pistons 20a-f (FIG. 3c). This normally closed position is maintained by means of spring 30 which biases pistons 20a-f into the closed, hole covering position thereby preventing both communication of lubricating graphite from storage box 12 into dispensing pipe 14 and dispensing of graphite from pipe 14 onto the support rollers. It will be observed that the forward and rearward most pistons 20a and 20f respectively have additional piston rings 38a and 38b positioned adjacent the inner surface thereof respectively. The purpose of piston rings 38a and b is to provide a substantially powder tight seal with the inner surface at pipe 14 so as to retain the lubricating graphite powder between pistons 20a and 20f.

Also shown in FIG. 2 is the rain gutter 26 positioned on the under side of dispensing pipe 14. As mentioned above, the purpose of rain gutter 26 is to prevent any rain which might fall on the apparatus from being conducted underneath pipe 14 and back of under the dispensing holes 22a-d (not shown).

Control means 16 is illustrated in FIG. 2 and is secured to the rearward end of discharge pipe 14 opposite cap 24. The purpose of control means 16 is to control the timing and duration of application of graphite to the support rollers. Control means 16 comprises solenoid 32 which is secured to piston shaft 28. Solenoid 32 could be an electric or air solenoid or other configuration which is operative to move shaft 28. When a dose of lubricating graphite is to be applied, solenoid 32 pulls piston shaft 28 rearwardly which establishes the open, discharge position of pistons 20a-f. As described above, the open, discharge position of pistons 20a-f causes dispensing holes 22a-d to be uncovered (FIG. 3b), thereby allowing graphite to fall from discharge pipe 14 onto the support roller. This open position of pistons 20a-f also allows graphite powder to be communicated from box 12 into pipe 14. The difference in piston position between the open discharge position and the closed position is illustrated more clearly in FIGS. 3b and c below. Biasing spring 30 receives piston shaft 28 therein and is positioned between the rearward most piston 20f on one end and the control box 34 on the other. Thus, spring 30 tends to bias the pistons 20a-f in the closed position thereby covering receiving and dispensing holes 18a-f and 22a-d respectively. When the control means is activated, motor 32 moves shaft 28 rearwardly compressing spring 30 and uncovering receiving holes 18a-f and dispensing holes 22a-d. When solenoid 32 is de-energized, biasing spring 30 urges shaft 28 and pistons 20a-f back into the closed position. The difference in piston positioning between the open discharge position and the closed position is illustrated clearly in FIGS. 3b and c.

Figure 3A:
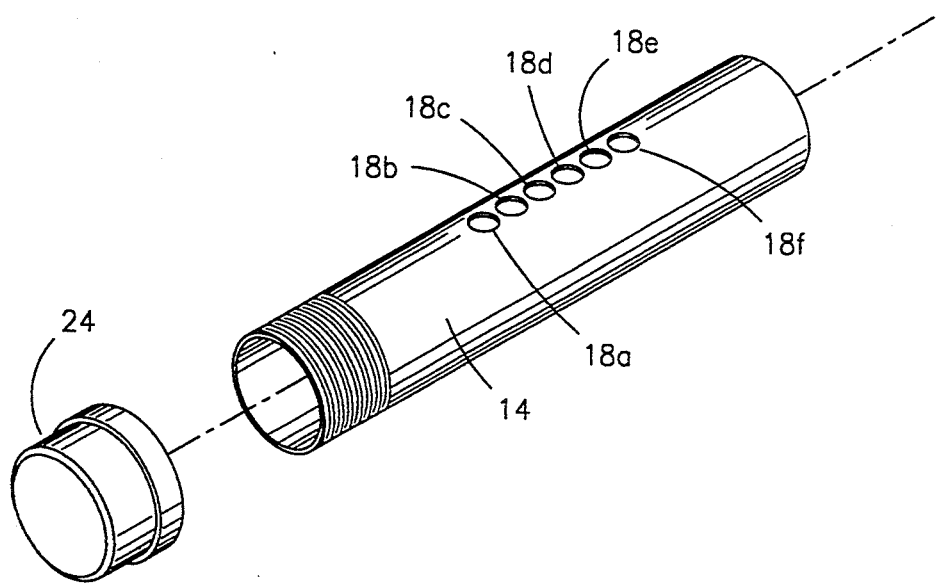
FIG. 3a is a detailed perspective view of the dispensing pipe of the lubrication apparatus showing the upper, receiving holes.
Figure 3C:
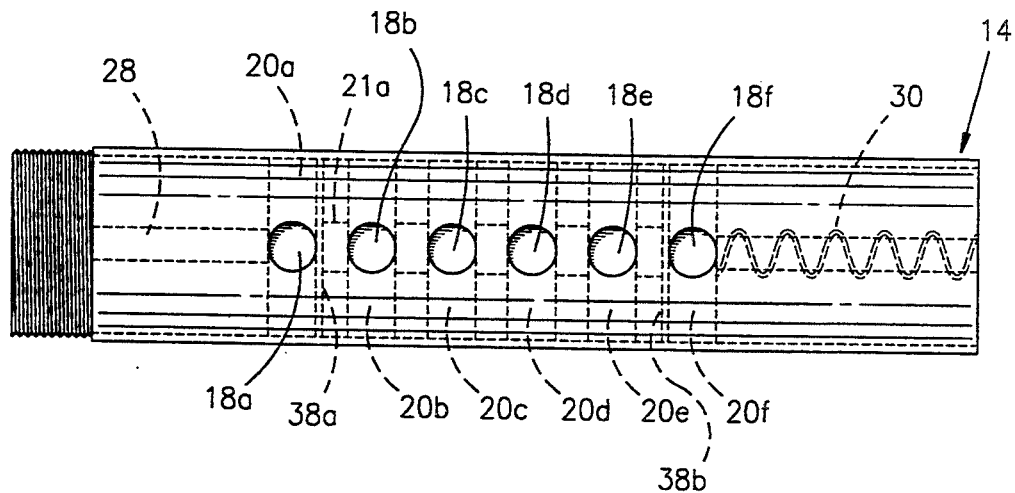
FIG. 3c is a top view of the pipe showing the receiving holes and the internal components of the dispensing means in the closed position.
Figure 3B:
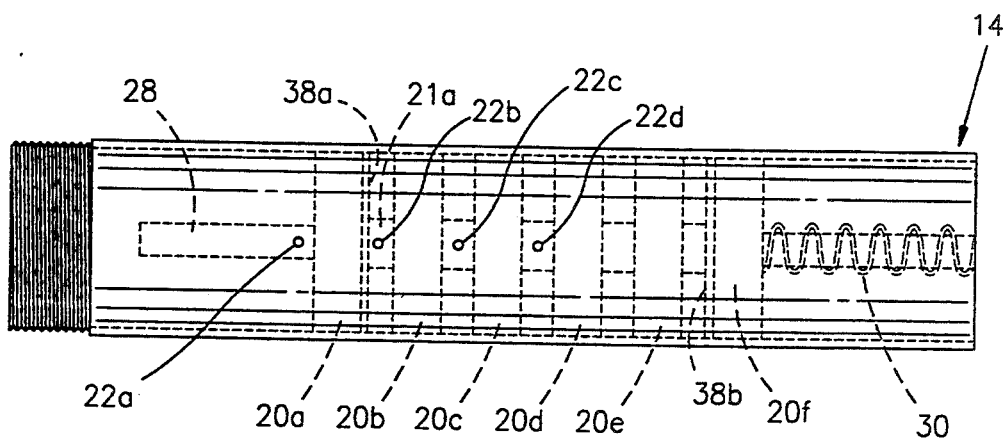
FIG. 3b is a bottom view of the dispensing pipe of the present invention showing in hidden lines the internal components comprising the dispensing means in the discharge position.

FIGS. 3a, b and c illustrate different features in the discharge pipe 14. FIG. 3a is a perspective view showing one end of the pipe and the graphite receiving holes 18a-f on the top thereof. As seen in FIG. 3a, the forward end of discharge pipe 14 is enclosed by means of cap 24 which is threadably received on the forward end of pipe 14. FIGS. 3b and c show the bottom and top respectively of pipe 14 and illustrate the pistons in the open discharge position and closed position respectively. As seen in FIG. 3b, the bottom of dispensing pipe 14 comprises four discharge holes 22a–d whereas the top portion of discharge pipe 14 comprises six graphite receiving holes 18a–f. The number and spacing of the discharge holes can be varied to accommodate different widths of rollers/tires, the objective being to provide graphite along the tire/roller junction. As mentioned above, FIG. 3b illustrates the positioning of the pistons of the open, discharge mode. As seen from the figure, pistons 20a–f are positioned so as to be between holes 22a–e thereby permitting graphite to flow out of holes 22a–d. Also seen in FIG. 3b is the compression of biasing spring 30 caused by the pulling of the piston mounting shaft 28 by the control solenoid (not shown). Conversely, FIG. 3c illustrates the pistons in the closed position. As seen in this figure, pistons 20a–f are positioned so as to cover holes 18a–f. Since the diameter of pistons 20a–f is substantially equivalent to the inside diameter of pipe 14, they are operative to block holes 18a–f and 20a–d when positioned thereover. Similarly, since dispensing holes 22a–d are positioned directly below receiving holes 18a–d, pistons 20a–d would also cover dispensing holes 22a–d thereby preventing any graphite from being dispensed from pipe 14. Also shown in FIG. 3c is the biasing spring 30 in the relaxed position corresponding to the closed position.

FIG. 4 is an end view of the working environment of the lubrication invention wherein the apparatus is installed on a conventional rotating dryer 100. As mentioned throughout the specification, the lubrication apparatus of the present invention is designed for use on any of a number of dryers, kilns or the like. A dryer has been selected for illustration only because it provides an effective means for illustrating the lubrication apparatus and the device requiring lubrication. As seen in FIG. 4, a typical rotating dryer 100 comprises a cylindrical drum 110 around which is encircled a set of drum tires 114a and b (not shown). Support rollers 112a through d are designed to contact the drum tires 114a and b and provide a means of support of the drum 110 during its rotation. As seen in the figure, support rollers 112a and b are designed to contact the tire at approximate equidistant position around the circumference of the drum tire 114a. The graphite dispensing apparatus 10 of the present invention is positioned above and adjacent one of the support rollers in each pair. As described above, during the discharge of graphite from the apparatus 10 by means of dispensing pipe 14, the graphite falls onto the support roller 112a. Due to the material properties of graphite powder, it remains in contact with the roller while it is rotated as indicated in the figure by the movement arrow. After a small amount of rotation, the support roller will contact the drum tire 114a wherein the graphite powder will form a lubricating film between the roller 112a and the tire 114. Owing again to the material properties of the graphite, a small portion of the graphite powder distributed on roller 112a by the apparatus 10, will adhere to the tire 114a. It will then rotate with tire 114a eventually contacting support roller 112b wherein some of the graphite will be transferred onto roller 112b. After a time, the transfer of graphite between rollers 112a and b and the drum tire 114a will reach an equilibrium point wherein a thin coating of graphite is established on the tire and supporting rollers. Thus, a single point of application as indicated in FIG. 4 will be effective to lubricate the entire drum and support roller pair. As illustrated more clearly in FIG. 5 below, a typical rotating dryer 100 comprises a pair of drum tires and further each drum tire has associated therewith a pair of rollers. Thus, for complete lubrication of the rotating dryer, two lubricating apparatus would be provided, one for each tire.

FIG. 5 is a front perspective view of the installation of the graphite lubrication apparatus of the present invention in a typical working environment installed on a conventional rotating dryer showing both drum tires 14a and b. As mentioned above, in a typical installation, a single rotating dryer 100 will have two drum tires 114a and b distributed along its length for support. Each drum tire would then have associated therewith a pair of support rollers such as that illustrated above in FIG. 4. Therefore, for complete lubrication of the rotating dryer mechanism, two lubrication devices would be provided, one associated with each drum tire 14a and b.

Figure 6:
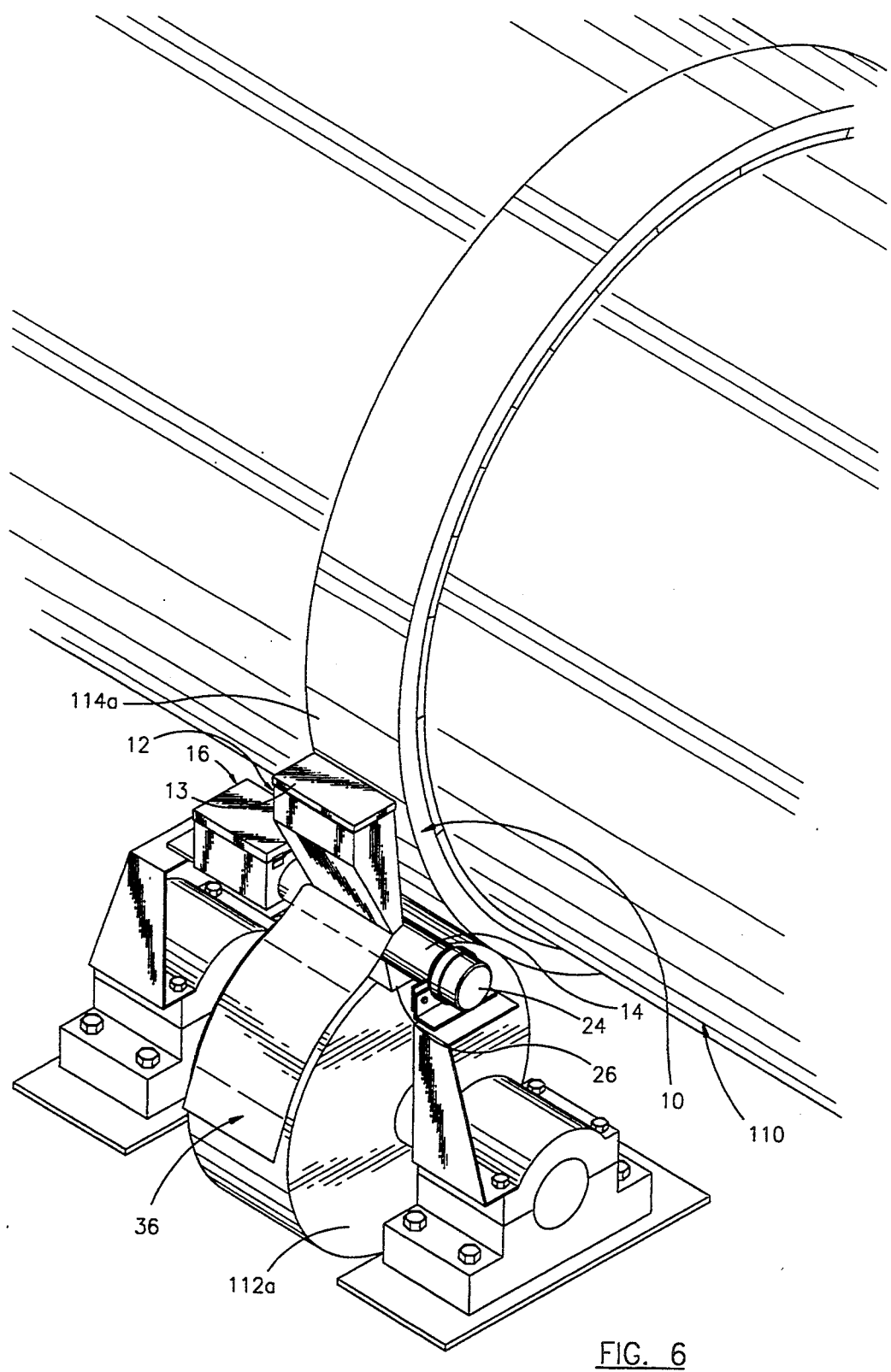
FIG. 6 is an enlarged perspective view illustrating installation of the lubrication apparatus on a typical rotating dryer.

Finally, FIG. 6 is an enlarged perspective view showing in detail the installation of the lubrication apparatus of the present invention on a typical rotating dryer device. As seen from this figure, the apparatus is installed such that the dispensing pipe 14 is positioned generally above and adjacent the support roller 112a. As indicated in the figure, the support roller rolls such that the graphite deposited by the apparatus 10 is brought into physical contact with the associated drum tire 114a. As mentioned above, the physical properties of the graphite powder cause some of the powder to adhere to drum tire 114a wherein it is conveyed to the remaining support roller 112b associated with the drum tire 114a thereby achieving a lubrication of all rotating components by distribution of graphite powder on a single roller. Also seen in this figure, is the rain deflection apparatus 26 designed to prevent moisture from entering dispensing pipe 114. Further illustrated, is guard 36 which is operative to prevent foreign material contact with rotating roller 112a. Again it is important to note that the lubrication apparatus may be installed on dryers, kilns or the like.

It is obvious that numerous other modifications and variations of the present invention are possible in view of the above teaching. For example, an important modification would be the size and number of receiving and dispensing holes provided in the dispensing pipe 14. The number of holes and size of the pipe itself would correspond to the width of the rotating support roller 112 associated with the particular kiln apparatus. Another possible modification is the mechanization of the controller 16. As described above, the controller may be either an electric or air solenoid. However, many alternative devices could be used for controlling the movement of the dispensing pistons, one example of which might be some sort of a computer controlled device.

Therefore, it is to be understood that the above description is intended in no way to limit the scope of protection of the claims and is representative of only one of the several possible embodiments of the present invention.

Thus, there has been shown and described an invention which accomplishes at least all of the stated objectives.

I claim:

1. A graphite lubrication apparatus for lubricating support rollers of dryers, kilns, granulators, calsanators, or coolers by dispensing graphite powder across the surface of said roller comprising:

a graphite storage means for storing said graphite powder to be used for lubrication;

a dispensing pipe adjacent said graphite storage means and having a top and bottom and a plurality of receiving holes in the top thereof said receiving holes permitting communication of said graphite from said storage means into said dispensing pipe, said dispensing pipe also having a plurality of discharge holes positioned adjacent said roller, said discharge holes permitting the discharge of graphite onto said roller;

a discharge means for discharging said graphite from said dispensing pipe onto said roller, said discharge means movable between a discharge position wherein said receiving and discharge holes are open and a closed position wherein said discharge and receiving holes are closed whereby said discharge means is operative to effect the application of graphite to said roller; and control means associated with said discharge means and operative to move said discharge means from said discharge position to said closed position and wherein movement of said discharge means by said control means from said closed position to said discharge position is operative to cause an amount of graphite to be communicated from said storage means into said dispensing pipe and to cause an amount of graphite to be discharged through said dispensing pipe discharge holes and onto said roller thereby lubricating the surface thereof.

2. The invention of claim 1 further comprising a biasing means operative to bias said discharge means into said closed position.

3. The invention of claim 1 wherein said discharge means is a plurality of pistons positioned internally of said dispensing pipe and having a diameter substantially equal to the inside diameter of said pipe and further wherein the spacing of said pistons is equivalent to said receiving holes such that said pistons are operative to block said holes when co-registered therewith.

4. The invention of claim 1 wherein said control means is an air solenoid.

5. The invention of claim 1 wherein said control means is an electric solenoid.

6. The invention of claim 1 further comprising a rain diverter for diverting rain away from said dispensing pipe.

7. The invention of claim 2 wherein said biasing means is a spring.

8. The invention of claim 3 further comprising a plurality of piston rings operatively associated with said pistons for containing said graphite powder within said dispensing pipe.

9. In combination;

a rotating drum having an elongated, cylindrical working portion and a plurality of support rings circumferentially surrounding said cylindrical portion and in spaced relation to each other;

a plurality of support roller pairs associated with said plurality of support rings respectively; and a graphite lubrication apparatus for lubricating said plurality of support rollers by dispensing a line of graphite powder across the surface of said rollers having;

a graphite storage means for storing said graphite powder to be used for lubrication;

a dispensing pipe adjacent said graphite storage means for receiving and discharging graphite and permitting the discharge of graphite onto said rollers;

a discharge means for discharging said graphite from said dispensing pipe onto said roller to effect the application of graphite to said rollers; and control means associated with said discharge means and operative to control said discharge means to cause an amount of graphite to be communicated from said storage means into said dispensing pipe and to cause an amount of graphite to be discharged through dispensing pipe discharge holes and onto said rollers thereby lubricating the surface thereof.

10. A method of lubricating the support rollers used to support a rotating cylinder comprising:

providing a graphite lubrication apparatus for lubricating said support rollers supporting said rotating cylinder by dispensing a line of graphite powder across the surface of said rollers having:

a graphite storage means for storing said graphite powder to be used for lubrication;

a dispensing pipe adjacent said graphite storage means for receiving and discharging graphite and permitting the discharge of graphite onto said rollers;

a discharge means for discharging said graphite from said dispensing pipe onto said roller to effect the application of graphite to said rollers;

control means associated with said discharge means and operative to control said discharge means to cause an amount of graphite to be discharged through said dispensing pipe discharge holes and onto said rollers thereby lubricating the surface thereof;

installing a supply of graphite in said graphite storage means;

positioning said lubrication apparatus adjacent a support roller associated with said rotating cylinder; and controlling said discharge means so as to cause application of a desired amount of said graphite to said support rollers.

11. The method of claim 10 wherein the step of controlling said discharge means to effect application of a predetermined amount of graphite includes the step of adjusting the controller timing so as to cause the frequency and time interval when said discharge means is in said discharge position thereby controlling the amount of lubricating graphite which is applied to said roller.

* * * * *